United States Patent

Dahill, Jr.

[15] 3,637,533

[45] Jan. 25, 1972

[54] PERFUME-CONTAINING COMPOSITIONS CONTAINING CERTAIN OXIMES AS OLFACTORY AGENTS

[72] Inventor: Robert T. Dahill, Jr., Perth Amboy, N.J.

[73] Assignee: Givaudan Corporation, Clifton, N.J.

[22] Filed: Feb. 14, 1967

[21] Appl. No.: 617,761

[52] U.S. Cl. .................................252/522, 424/45, 424/69
[51] Int. Cl. ........................................A61k 7/00, C11b 9/00
[58] Field of Search ..................................252/522; 260/566

[56] References Cited

OTHER PUBLICATIONS

Simonsen, The Terpenes, Cambridge Univ. Press, Vol. I 1931, pp. 59, 60, 64, 81, 82

Primary Examiner—Albert T. Meyers
Assistant Examiner—A. P. Fagelson
Attorney—Richards and Cifelli, George D. Richards and Thomas Cifelli, Jr.

[57] ABSTRACT

The use of certain oximes as olfactory agents in perfume compositions is described. The oximes are those of seven to 10 carbon atom aliphatic aldehydes and Ketones, excluding oximes of saturated, straight-chain aldehydes. Numerous examples showing the use of the oximes in various perfume compositions are given, as well as examples showing the preparation and identifying properties of the following 3 novel oximes: 3,7-dimethyloctanal oxime; 2,6-dimethyl-5-heptenal oxime and 3-methylheptan-5-one oxime.

13 Claims, No Drawings

PERFUME-CONTAINING COMPOSITIONS CONTAINING CERTAIN OXIMES AS OLFACTORY AGENTS

The present invention relates to perfume-containing compositions containing certain oximes as olfactory agents.

Oximes have been known for many years. They have been used chiefly as derivatives to characterize aldehydes and ketones for the reason that most oximes are solid. Oximes have also found use in connection with synthetic methods, for example, to form amines on reduction, or nitriles on dehydration. However, extended searches through the scientific and patent literature have failed to unearth any disclosure or teaching that oximes possess desirable odorous and other qualities which might make them desirable olfactory agents for use in perfume compositions. Surprisingly, it has now been found that a limited number of oximes possesses such qualities.

The oximes which have been found useful in accordance with this invention are those of seven to 10 carbon atom branched-chain ethylenic unsaturated hydrocarbyl aldehydes and ketones. Among specific oximes found to be suitable in accordance with the invention are one citral oxime; citronellal oxime; 2,6-dimethyl-5-heptenal oxime; 3-methylheptan-5-one oxime; octan-3-one oxime; 3,7-dimethyloctanal oxime; 2-methylheptan-6-one oxime; heptan-2-one oxime; nonan-3-one oxime; octan-2-one oxime and 2-methyl-2-hepten-6-one oxime.

The specificity of the present finding can be seen from the fact that oximes having closely related chemical structure are not suitable for the purposes of this invention. Examples of such latter oximes are n-heptaldehyde oxime and n-nonanal oxime. Also, it is to be noted that oximes having less than six or more than 10 carbon atoms are unsuitable for perfuming purposes.

The oximes useful in accordance with this invention possess a unique combination of olfactorily desirable properties. They are all either colorless (i.e., water-white) or only slightly colored, readily available, uniform in odor from batch to batch, nonirritating when used in accordance with this invention, stable and easy to use. These oximes possess truly unique odors not presently duplicated either by known natural or other synthetic odorants.

The oximes encompassed by this invention may be employed in a variety of perfume-containing compositions, such as fragrances or perfumes, perfume oils, toilet water, cosmetics, creams, detergents, soaps, lotions, space deodorants and other deodorants, etc.

The oximes of this invention are especially useful for imparting the quality of naturalness to perfume-containing compositions when used in formulations simulating natural oils such as lilac, lavender, etc.

The amounts of the hereinabove-identified oximes which may be used differ widely, mainly depending on the nature of the compositions and the desires of the perfume compounder. For purposes of illustration, it has been found that, in general, amounts from about 0.1 to about 80 percent by weight, based on the weight of the finished perfume-containing composition, give satisfactory results, amounts from about 0.1 to about 10 percent being especially satisfactory.

The oximes may be incorporated in perfume-containing compositions in conventional manners; hence, no special directions are deemed necessary to enable one skilled in the art to practice this invention. Nevertheless, in order to facilitate practice of this invention the following examples are given, by way of illustration and not by way of limitation. All parts and percentages are by weight, the percentages being based on the total composition, unless otherwise stated.

EXAMPLE I

3-Methylheptan-5-One Oxime

This novel oxime was prepared as follows:

Into a 2-liter, 3-necked flask fitted with a mechanical stirrer, dropping funnel and condenser was charged 82.1 g. of hydroxylamine sulfate and 100 ml. of water. To this solution was added dropwise 118.5 g. of 33.7 percent sodium hydroxide at 30° C. When the addition was complete a solution of 128 g. of 3-methyl-5-heptanone in 300 ml. of ethyl alcohol was added dropwise at 30° C. The resulting mixture was refluxed for 1 hour at 80°–85° C. The mixture was poured on a large volume of water. The organic material was separated and the water phase extracted several times with toluene. The combined organic phases were washed once more with water. The solvent was removed under 20 mm. of mercury pressure and the product distilled through a 37 mm. column packed with glass helices: b.p. 70° (0.7 mm.); 95.0 g.; $n_D^{20}$ 1.4519; Anal. Calcd. for $C_8H_{15}NO$: %N, 9.92; Found 9.50. The infrared spectrum shows absorption at 3.35 (—OH) and 6.10 (C=N) microns. Carbonyl value 0.0.

The novel oxime has an intense green-leaf odor quite suggestive of crushed figue leaves. It is useful as a base for the synthetic reconstruction of the odor of natural figue leaves absolute, as illustrated by the following formulation:

| | |
|---|---|
| Coumarine | 30 |
| Heliotropine | 20 |
| Benzyl Valerianate | 20 |
| Estragole | 60 |
| 3-methylheptan-5-one oxime | 485 |
| Linalool | 80 |
| Nonadienal | 5 |
| Raldeine gamma | 300 |
| Total | 1,000 |

Raldeine is the registered trademark of Givaudan Corporation for methylionones.

The novel oxime of this example can be used as a total or partial substitute for natural figue leaves absolute. It has the following advantages over the natural products:

Lower cost

Readily available

Constant in odor (the natural product varies from crop to crop)

Colorless (the natural product imparts an intense green color)

Nonirritant (natural figue leaves absolute has been reported as an irritant when in contact with the skin)

Stable in soap, cosmetics, and aerosols.

The novel oxime itself is stable in soap, detergents, cosmetics, and aerosol. Under accelerated tests and a 6-month shelf test it does not give any signs of discoloration or change in odor. Its odor is unique in its likeness to figue leaves absolute and it cannot be replaced in the above formulation by any other known chemical or composition.

EXAMPLE II

Octan-3-One Oxime

The oxime of this example is a known compound. It possesses an intense green-earthy odor suggestive of crushed twigs and moss. It is useful as a base for the synthetic reconstitution of the odor of natural oak moss, as illustrated by the following formulation:

| | |
|---|---|
| Coumarine | 180 |
| 3-hydroxy-2-methyl-4H-pyran-4-one | 27 |
| Anisyl acetate | 36 |
| Cade oil | 18 |
| Cedarleaf American | 90 |
| Cedarwood American | 540 |
| Octan-3-one oxime | 5,841 |
| n-hexyl benzoate | 540 |
| Isopropyl quinoline | 45 |
| Linalool | 900 |
| Linalyl isovalerate | 990 |
| Methyl acetophenone | 180 |
| Nonadienal | 3 |
| Raldeine gamma | 360 |
| Styrax soluble resin | 250 |
| Total | 10,000 |

The oxime of this example can be used as a total or partial substitute for natural oak moss. It presents over the natural products the following advantages:

Lower cost

Readily available and does not depend on natural products sometimes difficult to obtain Constant in odor (the natural product varies from crop to crop)

Colorless (the natural product imparts a green-brown color)

Stable in soap, cosmetics, aerosols (the natural product is unstable in aerosol).

The oxime of this example itself is stable in soap, detergents, cosmetics, and aerosol. Under accelerated tests and a 6-month shelf test it does not give any signs of discoloration or change in odor.

While there exist other synthetic reconstitutions of oak moss based on various chemicals, none possesses the intense green-earthy note of the oxime of this example; and it cannot be replaced in the above formula.

EXAMPLE III

2,6-Dimethyl-5-Heptenal Oxime

This novel oxime was prepared as follows:

Into a 3-liter, 3-necked flask fitted with a mechanical stirrer, dropping funnel and condenser was charged 164.2 g. hydroxylamine sulfate and 200 ml. of water. To this solution was added dropwise 237 g. of 33.7 percent sodium hydroxide at 30° C. When the addition was complete a solution of 330 g. of 85 percent (by weight) 2,6-dimethyl-5-heptenal in 600 ml. of ethyl alcohol was added dropwise at 30° C. The resulting mixture was refluxed for 1 hour at 80°-85° C. The mixture was poured on a large volume of water. The organic phase was separated and the water solution extracted with toluene. The combined organic phases were washed once more with water. The solvent was removed under 20 mm. of mercury pressure and the product distilled through a 37 cm. column packed with glass helices: b.p. 80°-1° (0.9 mm.) $n_D^{20}$ 1.4705; Sp. gr. 0.9028; Anal. Calcd. for $C_9H_{17}NO$: %N, 9.02; Found %N, 8.77, 8.59.

The infrared spectrum shows absorption at 3.30 (—OH) and 6.05 (C=N) microns. Carbonyl value 0.0.

The novel oxime of this example has a floral odor suggestive of Gardenia flower.

It is useful as a base for the synthetic reconstitutions of the odor of the Gardenia flower, as illustrated by the following formulation:

| Heliotropine | 39 |
|---|---|
| Indol | 1 |
| Amyl cinnamic aldehyde | 45 |
| Benzyl acetate | 65 |
| Cinnamic alcohol | 45 |
| 2,6-dimethyl-5-heptenal oxime | 340 |
| Laurine | 170 |
| Linalool | 75 |
| Linalyl acetate | 75 |
| Phenyl ethyl alcohol | 85 |
| d-methylbenzyl acetate | 60 |
| Total | 1,000 |

Laurine is the registered trademark of Givaudan Corporation for hydroxycitronellal.

This composition has a floral odor suggestive of Gardenia flower. Since no absolute or essence can be extracted from Gardenia flowers any composition that simulates the odor of these flowers is highly desirable. 2,6-Dimethyl-5-heptenal oxime is extremely valuable and unique in its contribution to the natural character of the above composition and cannot be replaced by any other chemical.

The oxime of this example is stable in soap, detergents, cosmetics, and aerosols. Under accelerated tests and a 6-month shelf test it does not give any signs of discoloration or change in odor.

EXAMPLE IV

Citral Oxime

The oxime of this example is a known compound. It has a diffusive musty odor quite suggestive of sea weeds or algae.

This oxime is useful as a base for a synthetic synergistic perfume composition, that is it blends with the other constituents of the composition giving it a unique effect not present in the formulation without this oxime, as illustrated by the following formula:

| Versalide polycyclic musk | 54 |
|---|---|
| Labdanum resin | 50 |
| Citral oxime | 645 |
| Civette absolute | 1 |
| 3,7,11-trimethyl-1,6,10-dodecatriene-3-ol | 150 |
| Raldeine gamma | 100 |
| Total | 1,000 |

Versalide is the registered trademark of Givaudan Corporation for 1,1,4,4-tetramethyl-6-ethyl-7-acetyl-1,2,3,4-tetrahydronaphthalene.

The above oxime can be used in the same manner and in place of ambergris natural. It presents over the natural product the following advantages:

Lower cost

Readily available

Constant in odor (the natural product varies according to its origin)

Facility of use (does not require being put into and aged in alcohol as does ambergris natural).

Citral oxime is stable in soap, cosmetics, and aerosols. Under accelerated tests and a 6-month shelf test it does not give any signs of discoloration or change in odor.

The odor of citral oxime is entirely new in the respect that up until now the odor of sea weed was very difficult to obtain from either chemicals or natural products.

EXAMPLE V

Citronellal Oxime

The oxime of this invention is a known compound.

The following formula exhibits the extremely important function of citronellal oxime in this type of composition based on the unusual qualities of odor character, which in turn indicates its unique application in perfumery:

| Bergamot natural | 15 |
|---|---|
| Citral | 5 |
| Citronellal oxime | 40 |
| Lemon oil | 10 |
| Lemongrass redistilled | 8 |
| Limes distilled W.I. | 5 |
| Mandarine messina | 6 |
| Orange bitter | 10 |
| Vanillin lignin | 1 |
| Total | 100 |

The above formula utilizing 40 percent of citronellal oxime may be used as a replacement for verbena oil. The natural oil is not used to any great extent in perfumery today due to the poor yield of oil and the difficulty in the cultivation of the plant involving climatic conditions. The above formula or variations of it using citronellal oxime offers uniformity of odor, availability of material, and reasonable stability in price.

The leafy-green-rosy-citrus odor character of citronellal oxime makes it invaluable, both for citrus types of fragrances as well as straight florals and floral bouquets.

Citronellal oxime is stable in soap, cosmetics, and aerosols. The odor performance of this chemical in test samples shows excellent stability.

EXAMPLE VI

3,7-Dimethyloctanal Oxime

This novel oxime was prepared as follows:

Into a 1-liter, 3-necked flask fitted with a mechanical stirrer, dropping funnel and condenser was charged 82.1 g. of hydroxylamine sulfate and 150 ml. of water. To this solution was added dropwise 190 g. of 33.7 percent sodium hydroxide at 30° C. When the addition was complete a solution of 156 of 3,7-dimethyloctanal in 150 ml. of ethyl alcohol was added dropwise at 30° C. The resulting mixture was refluxed for 1 hour at 80°–85° C. The mixture was poured on a large volume of water. The organic material was separated and the water layer extracted several times with toluene. The combined organic phases were washed once more with water. The solvent was removed under 20 mm. of mercury pressure and the product distilled through a 37 cm. column packed with glass helices: b.p. 94°–101° (0.7 to 0.9 mm.) 74.4 g.; $n_D^{20}$ 1.4512; Sp. gr. 0.8701; Anal. Calcd. for $C_{10}H_{21}NO$: %N, 8.18; Found: %N, 7.99.

The infrared spectrum shows absorption at 3.30 (—OH) and 6.10 (C=N) microns. Carbonyl value 0.0.

The following formula exhibits the uniqueness of the novel oxime of this example and how it may be employed in perfumery:

| | |
|---|---|
| Undecanal 10% in dipropylene glycol | 2 |
| Eugenol USP | 10 |
| Citronellol leavo | 10 |
| Geraniol | 30 |
| Geranium bourbon | 50 |
| Geranium palmarosa | 50 |
| 3,7-dimethyloctanal oxime | 400 |
| Phenyl ethyl alcohol | 438 |
| Raldeine gamma | 10 |
| Total | 1,000 |

The novel oxime of this example contributes an earthy-green-rosy character which gives a naturalness of odor resembling that of freshly cut flowers. This unique combination of notes is virtually impossible to obtain by the use of existing perfumery materials.

The oxime of this example was found to be stable in soap, cosmetics, and aerosols. The basic odor character of this chemical held up well with no significant change on standing.

EXAMPLE VII

2-Methylheptan-6-One Oxime

The oxime of this example is a known substance.

The following formulation illustrates the importance of this oxime as an integral part of a synthetic jasmine:

| | |
|---|---|
| Nonanolide-1,4,10% in dipropylene glycol | 5 |
| Amyl cinnamic aldehyde | 200 |
| Beeswax absolute | 5 |
| Benzyl acetate | 250 |
| Benzyl alcohol, perfumery grade | 185 |
| Benzyl propionate | 20 |
| Celery seed oil | 5 |
| Eugenol USP | 5 |
| Indole | 5 |
| 2-methylheptan-6-one oxime | 300 |
| Methyl octine carbonate, 10% in dipropylene glycol | 5 |
| Para cresol, 10% in dipropylene glycol | 10 |
| Para cresyl phenyl acetate | 5 |
| Total | 1,000 |

The oxime of this example contributes an earthy-musty-fatty odor character which is an essential part of this composition. The oxime yields a naturalness which would be difficult to obtain with existing materials.

The oxime of this example was found to be stable in soap, cosmetic media, and aerosols.

EXAMPLE VIII

Heptan-2-One Oxime

The oxime of this example is a known material.

The following base illustrates the synergistic effects contributed by the oxime of this example:

| | |
|---|---|
| Anethol USP | 5 |
| p-anisaldehyde | 30 |
| Balsam copaiba gum | 60 |
| Civet absolute, 10% in dipropylene glycol | 5 |
| Ethyl malonate | 200 |
| Folione, 10% in dipropylene glycol | 15 |
| Geraniol Q's | 50 |
| Labdanum soluble resin | 150 |
| Methyl acetophenone | 30 |
| Heptan-2-one oxime | 437 |
| Phenyl acetaldehyde 50% in dipropylene glycol | 10 |
| Phenyl acetic acid | 8 |
| Total | 1,000 |

Folione is a registered trademark of Givaudan Corporation for methyl 2octynoate.

The above composition, a mimosa variation, illustrates how the oxime of this example can be used in conjunction with other materials to produce an overall effect. Its rich earthy-musty odor character blends harmoniously to produce unusual and interesting perfume blends.

The oxime of this example has been found to be stable in soap, cosmetic media, and aerosols. The accelerated aging and normal shelf test samples have shown no depression or change in basic odor character.

EXAMPLE IX

Nonan-3-One Oxime

The oxime of this example is a known material.

The oxime of this example has an odor suggestive of galbanum, lavender, and cucumber. It also has a characteristic odor which is natural, green, and fresh. In addition to galbanum, lavender, cucumber, other uses for this oxime are found in rose-geranium, jasmine, citrus, pine, and violet compositions. Its odor is very intense and persistent, as indicated by dry-down studies. Tests have also indicated that the oxime of this example has synergistic properties. The following application formula demonstrates the use of this oxime as a major perfume component and as a synergist:

| | |
|---|---|
| alpha pinene | 50 |
| beta pinene | 100 |
| Camphene | 5 |
| Myrcene | 10 |
| Carene delta 3 | 45 |
| Dipentene | 5 |
| Isocyclo citral (2,4,6-trimethyl-3-cyclohexen-1-carboxaldehyde and 2,3,5-trimethyl-4-cyclohexen-4-carboxaldehyde) | 35 |
| Galbanum Oil | 250 |
| Nonan-3-One Oxime | 500 |
| Total | 1,000 |

Nonan-3-one oxime was used in the above formulation for the following reasons:

1. Its odor is such that it forms good accords with naturals like galbanum, even with 50/50 mixtures.
2. Because it is colorless, it minimizes the undesirable color caused by the natural.
3. Because it is a synthetic, its availability and consistency are insured, with low cost as compared to the natural, which is not always available with constant quality.

EXAMPLE X

Octan-2-One Oxime.

The oxime of this example is a known material.

Octan-2-one oxime has an odor suggestive of lavender, with a natural, earthy, green, weedy, fresh, clean background. In addition to lavenders and lavender fougere, this oxime is useful in amber-orientals, rose-geraniums, jasmines, citrus and pine. Its odor is intense and persistent. In addition, this oxime can act as a synergist. The following application formula will demonstrate the use of this oxime as a synergist and a major perfume ingredient:

| | |
|---|---|
| Linalyl propionate | 5.0 |
| Coumarin | 2.0 |
| Methyl coumarin | 2.0 |
| Versalide | .5 |
| Geraniol | 2.0 |
| Geranyl acetate | 2.0 |
| Geranyl propionate | 2.0 |
| Linalool | .5 |
| Linalyl acetate | 5.0 |
| Menthanyl acetate | 25.0 |
| Methyl hexyl ketone | 1.0 |
| Terpinyl acetate | 3.0 |
| Lavandin pure | 50.0 |
| Octan-2-one oxime | 100.0 |
| Total | 200.0 |

The oxime of this example was used in the above formulation for the following reasons:
1. Its odor has the power to give a fresh, natural, green character to the compound, in addition to enhancing the lavender notes.
2. It is stable in perfumes, cosmetics, etc., and its use in a formulation minimizes instability in the final product.
3. Its light color would minimize the undesirable color of the naturals.
4. Because it is a synthetic, its consistency and availability are insured, in addition to low cost.

EXAMPLE XI

2-Methyl-2-Hepten-6-One Oxime

The oxime of this example is a known compound.

The oxime of this example has an odor suggestive of fresh citrus fruits, with a natural, bitter, herbaceous, leafy, green character. In addition to citrus type odors, this oxime can be used in lavenders, jasmines, muguets, rose, pine, and especially fig-type compounds. In addition to being very intense and persistent, this oxime has synergistic properties. The following formulation demonstrates its use as a major perfume component:

| | |
|---|---|
| Undecyl Alcohol | 0.5 |
| Octanal | 0.1 |
| Nonanal | 0.1 |
| Decanal | 0.1 |
| Citral | 6.5 |
| Citronellal | 0.2 |
| Citronellol | 1.0 |
| Citronellyl Propionate | 1.5 |
| Dipentene | 10.0 |
| Geranyl Acetate | 1.5 |
| Lemon Terpenes | 25.0 |
| Linalool Coeur | 1.5 |
| Terpinyl Acetate | 2.0 |
| 2-methyl-2-hepten-6-one oxime | 50.0 |
| Total | 100.0 |

The oxime of this example was used in the above formulation for the following reasons:
1. Due to its unique odor, this oxime blends well with the other natural materials in the formulation, bringing out their fresh, natural, green character.
2. Due to its proven stability in perfumes, soaps, and cosmetics.
3. Due to its light color.
4. Because of its insured availability, consistency, and low cost.

EXAMPLE XII

Muguet Perfume

A perfume oil having a muguet character was made by mixing together the following ingredients in the amounts given:

| | |
|---|---|
| Laurine | 472 |
| Hydroxycitronellal dimethyl acetal | 88 |
| Rhodinol | 179 |
| Cinnamic alcohol | 31 |
| Phenylacetaldehyde dimethyl acetal | 16 |
| p-tert-butyl-alpha-methylhydrocinnamic Aldehyde | 16 |
| Hexylcinnamic aldehyde | 68 |
| Tetrahydrolinalool | 32 |
| Raldeine gamma | 13 |
| Isopulegol | 6 |
| Lemon oil | 8 |
| Styrax absolute resin | 9 |
| Ethyl vanillin 10% | 2 |
| 3-hydroxy-2-methyl-4H-pyran-4-one (10% in diethyl phthalate) | 3 |
| Indolene (Roure-Dupont) hydroxy-citronellal-indol condensation product | 47 |
| 2-methyl-2-hepten-6-one oxime | 10 |
| Total | 1,000 |

Laurine is a registered trademark of Givaudan Corporation for hydroxycitronellal.

The perfume oil of this example was incorporated to the extent of 1 percent in unperfumed soap stock. The soap used was a neutral white toilet soap. The fatty acids in this soap had the following composition:

| | |
|---|---|
| Oleic and linoleic acids | 45 |
| Palmitic acid | 30 |
| Stearic acid | 10 |
| Lower fatty acids | 15 |

The perfume oil of this example was also incorporated, to the extent of 0.1 percent in unperfumed synthetic liquid detergents such as those marketed as Lux and Swan, and to the extent of 0.2 percent in unperfumed synthetic powder detergents such as that marketed as All.

In all cases, the finished soaps and synthetic compositions had materially enhanced green top note of muguet fragrance, as compared with the same formulations without the oxime.

EXAMPLE XIII

Soaps and Synthetic Detergents

A soap cologne was made by mixing together the following ingredients in the amounts given:

| | |
|---|---|
| Petitgrain oil | 225 |
| Spike lavender oil | 50 |
| Bergamot oil | 150 |
| Lemon oil | 150 |
| Lemongrass oil | 75 |
| Methylnaphthyl ketone | 40 |
| Rosemary oil | 60 |
| Geranium oil | 100 |
| Citral | 100 |
| Citral oxime | 50 |
| Total | 1,000 |

The soap cologne had a bright and more appealing odor, with an enhanced citrus character, as compared with the same perfume without the citral oxime.

The soap cologne of this example was incorporated to the extent of 1 percent in the unperfumed soap stock used in example XII. The soap cologne of this example was also incorporated to the extent of 0.1 percent, in synthetic liquid detergents and 0.2 percent in synthetic powder detergents.

In all cases, the finished soaps and synthetic detergent compositions had a citrus odor which was much brighter and more appealing than the same compositions without the citral oxime.

EXAMPLE XIV

Perfume

A perfume composition was prepared by mixing the following ingredients in the stated amounts:

| | |
|---|---|
| Benzyl isoeugenol | 20 |
| Coumarin | 10 |
| Musk ambrette | 30 |
| Bergamot oil | 75 |
| Linalyl acetate | 125 |
| Geranium oil Algerian | 20 |
| Spike lavender oil | 20 |
| Lemon oil | 200 |
| Lime oil | 130 |
| Neroli oil | 160 |
| Orange oil, bitter | 100 |
| Orange oil, sweet | 100 |
| Rosemary oil | 20 |
| Clary sage oil | 20 |
| Citral oxime | 10 |
| Total | 1,000 |

The finished perfume oil was suggestive of a freshly crushed lemon peel and had an improved and more lasting quality and appeal than the same perfume without the citral oxime.

EXAMPLE XV

A perfume composition was prepared by mixing the following ingredients in the stated amounts:

| | |
|---|---|
| Coumarin | 20 |
| Musk ambrette | 25 |
| Vanillin | 10 |
| Tolu balsam soluble resin | 50 |
| Benzoin soluble resin | 50 |
| Bergamot oil | 10 |
| Brazilian Bois de Rose oil | 50 |
| Lavandin oil | 50 |
| Lavender oil | 500 |
| Petitgrain oil S.A. | 20 |
| Rosemary oil | 50 |
| Thyme oil, red | 25 |
| Menthanyl acetate | 50 |
| Trimethyl hexyl acetate | 80 |
| Octan-3-one oxime | 10 |
| Total | 1,000 |

The addition of the oxime lends a green woody note to the lavender composition while not altering the overall fragrance.

EXAMPLE XVI

A perfume composition was prepared by mixing the following ingredients in the stated amounts:

| | |
|---|---|
| Amyl cinnamic aldehyde dimethyl acetal | 10 |
| Citronellol | 150 |
| Ethyl pelargonate | 10 |
| Geraniol | 150 |
| Geranyl formate | 20 |
| Geranyl acetate | 10 |
| Geranium Bourbon | 240 |
| Linalyl Formate | 10 |
| Mimosa Absolute | 10 |
| Phenyl Acetic Acid | 10 |
| Phenyl Ethyl Acetate | 20 |
| Phenyl Ethyl Alcohol | 100 |
| Rhodinol | 200 |
| Rhodinyl Acetate | 50 |
| Heptan-3-One Oxime | 10 |
| Total | 1,000 |

The oxime blends well with this rose composition imparting a natural character to the fragrance.

The rose composition of this example was incorporated in the unperfumed soap stock, the liquid and powder detergents as described in example XII.

In all cases, the finished soaps and synthetic compositions had a pleasing leafy effect, as compared with the same products not containing the oxime of this example.

EXAMPLE XVII

Muguet Soap Perfume

A perfume composition was prepared by mixing the following ingredients in the stated amounts:

| | |
|---|---|
| Terpineol | 47 |
| Hydroxy citronellal | 465 |
| Dimethyl octanol | 115 |
| Citronellol | 116 |
| Phenylacetaldehyde dimethyl Acetal | 24 |
| Hexylcinnamic aldehyde | 22 |
| Linalool | 70 |
| Musk ambrette | 23 |
| Indolene, Roure-Dupont, (a condensation product between indole and hydroxy citronellal) | 23 |
| Benzoin resin | 24 |
| Cananga oil | 21 |
| 2-methyl-2-hepten-6-one oxime | 50 |
| Total | 1,000 |

The resulting perfume was of the muguet type, with a cool-green effect.

EXAMPLE XVIII

A perfume composition was prepared by mixing the following ingredients in the stated amounts:

| | |
|---|---|
| Benzyl acetate | 250 |
| Hexylcinnamic aldehyde | 17 |
| Cananga oil | 17 |
| Linalool | 167 |
| Laurine | 167 |
| Phenylethyl alcohol | 167 |
| Methyl salicylate | 23 |
| Methyl naphthyl ketone | 17 |
| Gamma nonalactone | 25 |
| Decanal (10% in diethyl Phthalate) | 17 |
| Ylang oil | 67 |
| Musk xylol | 8 |
| Eugenol | 8 |
| 2,6-dimethyl-5-heptenal oxime | 50 |
| Total | 1,000 |

The resulting perfume was of the gardenia type, suitable for use in soap and having a fresher, floral character than the same perfume without the oxime.

EXAMPLE XIX

A perfume composition was prepared by mixing the following ingredients in the stated amounts:

| | |
|---|---|
| Benzyl acetate | 220 |
| Hexylcinnamic aldehyde | 68 |
| Cananga oil | 22 |
| Linalool | 223 |
| Gamma-undecalactone | 2 |
| Laurine | 112 |
| Musk ambrette | 22 |
| Hydroxycitronellal-methyl-Anthranilate Schiff base | 2 |
| Phenylethyl alcohol | 212 |
| p-Cresylphenyl acetate 10% | 2 |
| Sandela | 45 |
| Ylang oil | 20 |
| 2-methylheptan-6-one oxime | 50 |
| Total | 1,000 |

Sandela is the registered trademark of Givaudan Corporation for isocamphylcyclohexanols polycyclic alcohol.

The perfume had a jasmine character and when incorporated in soap and detergents as set forth in example XII, was found to be quite suitable. The jasmine note was enhanced substantially by the oxime, which also imparted an unusually fine, green, floral character to the perfume.

EXAMPLE XX

Talcum Powder

A citrus base formulation was made by mixing together the following ingredients in the amounts indicated:

| | |
|---|---|
| Benzyl isoeugenol | 20 |
| Coumarin crystals | 10 |
| Musk ambrette | 30 |
| Bergamot oil | 200 |
| Geranium oil | 10 |
| Lavender spike oil | 20 |
| Lemon oil | 200 |
| Lime oil | 130 |
| Neroli oil | 160 |
| Orange oil bitter | 100 |
| Orange oil sweet | 60 |
| Rosemary oil | 20 |
| sage clary oil | 20 |
| Citronellal oxime | 20 |
| Total | 1,000 |

The above perfume mixture and the same formulation without the oxime was incorporated into a talcum powder base in concentrations of 0.5 percent by weight. Upon comparison of these cosmetic products it was found that the addition of citronellal oxime improved the odor, enhancing the citrus character of the fragrance and giving a lasting and pleasing effect when applied to the skin.

Citronellal oxime may be used in perfume compositions in concentrations of from 0.1 to 85 percent by weight depending upon the effect desired or the purpose intended. High concentrations of oxime would be used, for example, in aerosol formulations. The recommended use normally for this oxime is in the range of 0.1 to 10 percent by weight.

EXAMPLE XXI

Hand Lotion

A floral perfume of the jasmine type was made by mixing together the following ingredients in the amounts indicated:

| | |
|---|---|
| Benzyl acetate | 220 |
| Hexylcinnamic aldehyde | 68 |
| Cananga oil | 22 |
| Linalool | 223 |
| Gamma-undecalactone | 2 |
| Laurine | 112 |
| Musk ambrette | 22 |
| Aurantiol | 2 |
| Phenylethyl alcohol | 212 |
| p-cresylphenyl acetate 10% | 2 |
| Sandela | 45 |
| Ylang oil | 20 |
| Nonan-3-one oxime | 50 |
| Total | 1,000 |

Aurantiol is a registered trademark of Givaudan Corporation for hydroxycitronellal-methylanthranilate Schiff base.

This perfume mixture was incorporated into a standard hand lotion base to the extent of 0.5 percent by weight. Upon comparing this cosmetic preparation with one in which the jasmine perfume did not contain nonan-3-one oxime, it was found that the oxime enhanced the green top note of the fragrance and gave an overall improvement to the odor especially when the lotion was applied to the skin.

Ethyl hexyl ketone oxime may be used in perfume compositions in concentrations of from 0.1 to 85 percent by weight depending upon the effect desired or the purpose intended (see aerosol formulation). The recommended use is normally in the range of 0.1 to 10 percent by weight.

EXAMPLE XXII

Bath Oil

A floral perfume of the muguet type was made by mixing together the following ingredients in the amounts indicated:

| | |
|---|---|
| Terpineol | 47 |
| Laurine | 465 |
| Dimethyl octanol | 115 |
| Citronellol | 116 |
| Phenylacetaldehyde dimethyl acetal | 24 |
| Hexylcinnamic aldehyde | 22 |
| Linalool | 70 |
| Musk ambrette | 23 |
| Indolene (condensation product of indol and hydroxycitronellal) | 23 |
| Benzoin resin | 24 |
| Cananga oil | 21 |
| Heptan-2-one oxime | 50 |
| Total | 1,000 |

The above perfume mixture and the same formulation without the oxime was incorporated into an unperfumed bath oil to the extent of 10 percent by weight. This cosmetic preparation was evaluated from water warmed to 50° C. in order to simulate bath conditions. It was found upon comparison of the bath oil preparations that the addition of heptan-2-one oxime enhanced the cool green top note of the muguet and tended to add to the diffusibility of the fragrance emitted from the warmed water.

2-Heptanone oxime may be used in perfume compositions in concentrations of from 0.1 to 85 percent by weight depending upon the effect desired or the purpose intended. The recommended use is normally in the range of 0.1 to 10 percent by weight.

EXAMPLE XXIII

Hand Lotion

A rose perfume was made by mixing together the following ingredients in the stated amounts:

| | |
|---|---|
| Citronellol | 234 |
| Phenylethyl alcohol | 106 |
| Geraniol | 244 |
| Rhodinol | 96 |
| Laurine | 116 |
| Guaiacwood concrete | 13 |
| Eugenol | 6 |
| Irisone | 58 |
| Cinnamic alcohol | 5 |
| Phenylacetic acid | 1 |
| Undecylenic aldehyde | 1 |
| α-(trichloromethyl) benzyl acetate | 46 |
| Citral | 24 |
| 3,7-dimethyloctanal oxime | 50 |
| Total | 1,000 |

Irisone is a registered trademark of Givaudan Corporation for ionones.

This perfume mixture was incorporated into a standard hand lotion base to the extent of 0.5 percent. This cosmetic preparation was compared with one in which the rose perfume did not contain 3,7-dimethyloctanal oxime. It was found upon evaluation of the lotion that the presence of the oxime improved the rose fragrance, lending a fresh green note to the perfume.

3,7-Dimethyloctanal oxime may be used in fragrance compositions in concentrations of from 0.1 to 85 percent depending upon the effect desired or the purpose intended. The recommended use normally is in the range of 0.1 to 10 percent.

EXAMPLE XXIV

Aerosol Fragrance

A fragrance for use in an aerosol air freshener was made by mixing together the following ingredients in the stated amounts:

| | |
|---|---|
| 3-methylheptan-5-one oxime | 850 |
| Isobornyl acetate | 60 |
| Irisone | 5 |
| Patchouli oil | 13 |
| Lavandin oil | 50 |
| l-carvone | 8 |
| Cassie absolute | 5 |
| 3-hydroxy-2-methyl-4H pyran-4-one | 2 |
| Versalide | 7 |
| Total | 1,000 |

The above fragrance has a sweet pine-lavender odor wherein the 3-methylheptan-5-one oxime blends very well.

EXAMPLE XXV

Jasmine Soap Fragrance

The following jasmine soap perfume was compounded to demonstrate the use of 3-methylheptan-5-one oxime in soap:

| | |
|---|---|
| Benzyl acetate | 230 |
| Hexylcinnamic aldehyde | 68 |
| Cananga oil | 32 |
| Linalool | 233 |
| gamma undecalactone | 2 |
| Laurine | 112 |
| Musk ambrette | 22 |
| Hydroxycitronellal methyl Anthranilate Schiff base | 2 |
| Phenylethyl alcohol | 212 |
| p-cresyl phenylacetate 10% | 2 |
| Sandalwood oil | 45 |
| Ylang oil | 20 |
| 3-methylheptan-5-one oxime | 20 |
| Total | 1,000 |

The resulting jasmine soap fragrance was incorporated to the extent of 1 percent in the unperfumed soap stock referred to in example XII.

The resulting jasmine soap had a persistent and pleasing green note which was not present in the soap with the perfume composition without 3-methylheptan-5-one oxime.

As already noted, many oximes are well-known chemicals and processes for their preparation are known. In general, therefore, the oximes employed in accordance with this invention are made by treating the corresponding aldehyde or ketone with an equivalent amount of hydroxylamine. The latter may be formed, in situ, by liberation from a hydroxylamine salt, such as hydroxylamine sulfate or hydroxylamine hydrochloride, by treatment with a base. The resulting oximes are purified by distillation.

Details of the preparation of certain novel oximes possessing unobvious properties are given in examples I, III and VI.

While I have described my invention in detail in its presently preferred embodiments, it will be obvious to those skilled in the art that various changes and modifications may be made therein, particularly in the actual formulations employed, without departing from the spirit or scope of my invention. I aim in the appended claims to cover all such changes and modifications.

I claim:

1. A perfume-containing composition comprising an olfactorily effective amount of an oxime of a branched-chain ethylenic unsaturated hydrocarbyl aldehyde or ketone having from seven to 10 carbon atoms.

2. The perfume-containing composition of claim 1, wherein said oxime is selected from the group consisting of citral oxime; citronellal oxime; 2,6-dimethyl-5-heptenal oxime; 3-methylheptan-5-one oxime; octan-3-one oxime; 3,7-dimethyloctanal oxime; 2-methylheptan-6-one oxime; heptan-2-one oxime; nonan-3-one oxime; octan-2-one oxime and 2-methyl-2-hepten-6-one oxime.

3. The perfume-containing composition of claim 1, wherein said oxime is citral oxime.

4. The perfume-containing composition of claim 1, wherein said oxime is 2-methylheptan-6-one oxime.

5. The perfume-containing composition of claim 1, wherein said oxime is 2-methyl-2-hepten-6-one oxime.

6. The perfume-containing composition of claim 1, wherein said oxime is octan-2-one oxime.

7. The perfume-containing composition of claim 1, wherein said oxime is 3-methylheptan-5-one oxime.

8. A perfume blend containing an olfactorily effective amount of an oxime of a branched-chain ethylenic unsaturated hydrocarbyl aldehyde or ketone having from seven to 10 carbon atoms.

9. The perfume blend of claim 1 wherein said oxime is citral oxime.

10. The perfume blend of claim 1 wherein said oxime is 2-methylheptan-6-one oxime.

11. The perfume blend of claim 1 wherein said oxime is 2-methyl-2-hepten-6-one oxime.

12. The perfume blend of claim 1 wherein said oxime is octan-2-one oxime.

13. The perfume blend of claim 1 wherein said oxime is 3-methylheptan-5-one oxime.

* * * * *